US008330927B2

(12) United States Patent
Her et al.

(10) Patent No.: US 8,330,927 B2

(45) Date of Patent: Dec. 11, 2012

(54) DISPLAY DEVICE

(75) Inventors: Yong-Koo Her, Suwon-si (KR); Yong-Han Park, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 1148 days.

(21) Appl. No.: 12/194,810

(22) Filed: Aug. 20, 2008

(65) Prior Publication Data

US 2009/0243972 A1 Oct. 1, 2009

(30) Foreign Application Priority Data

Mar. 28, 2008 (KR) ........................ 10-2008-0029029

(51) Int. Cl.
*G02F 1/1345* (2006.01)

(52) U.S. Cl. ......................... 349/152; 349/151; 349/149

(58) Field of Classification Search .................. 349/152
See application file for complete search history.

(56) References Cited

U.S. PATENT DOCUMENTS

| | | | | |
|---|---|---|---|---|
| RE38,292 | E * | 10/2003 | Satou | 438/158 |
| 6,882,397 | B2 * | 4/2005 | Hayata et al. | 349/149 |
| 2008/0117345 | A1 * | 5/2008 | Ishii et al. | 349/40 |

* cited by examiner

*Primary Examiner* — Wen-Ying P Chen

(74) *Attorney, Agent, or Firm* — H.C. Park & Associates, PLC

(57) ABSTRACT

The present invention relates to a display device including a substrate, a display signal line disposed on the substrate, a contact assistant disposed on the pad region of the substrate as a draw-out terminal of the display signal line, a driver IC chip disposed on the substrate and connected to the display signal line through the contact assistant, and a testing thin film transistor disposed between the substrate and the driver IC chip. The testing thin film transistor and the display signal line are connected to each other.

16 Claims, 7 Drawing Sheets

DISPLAY DEVICE

CROSS-REFERENCE TO RELATED APPLICATION

This application claims priority from and the benefit of Korean Patent Application No. 10-2008-0029029, filed on Mar. 28, 2008, which is hereby incorporated by reference for all purposes as if fully set forth herein.

BACKGROUND OF THE INVENTION

1. Field of the Invention

The present invention relates to a display device. More particularly, the present invention relates to a display device including a driver IC chip mounted on a substrate.

2. Discussion of the Background

A liquid crystal display (LCD), a plasma display panel (PDP), and an organic light emitting device (OLED) are among widely used flat panel displays.

The liquid crystal display and the organic light emitting device include a display panel provided with a switching element, a gate line, and a data line, and a printed circuit board (PCB) provided with a circuit element such as a signal controller, a driving voltage generator, and a gray voltage generator. The PCB and the display panel may be connected to each other through a flexible printed circuit film.

A gate signal is generated by a driver integrated circuit (IC) chip, which receives signals from the driving voltage generator, and a data signal is generated by the data driver IC chip, which converts gray signals from the signal controller into analog voltages. Each of the gate and data driver IC chips may be a chip on glass (COG) type, a film on glass (FOG) type, or a tape carrier package (TCP) type. With the COG and the FOG types, the driver IC chips are formed on the substrate of the display device, and in the TCP type, a film having the driver IC chips formed thereon is additionally attached to the substrate of the display device. Conventionally, the TCP type has been the most commonly used, but because the size of the IC chips has recently been decreased and for various other reasons, the COG type is now widely used.

When applying the COG type to the display device, a visual inspection (VI) tester to test the operation of the display device is disposed under the driver IC chips. The VI tester includes a testing thin film transistor and constituent elements to connect to a display signal line. Because the size of the driver IC chips is gradually decreasing, the size of the VI tester disposed thereunder may be limited. Particularly, the size of the testing thin film transistor may be limited.

When the size of the testing thin film transistor is reduced, the testing waveform may be distorted by signal delay, productivity may decrease due to the detection of ignorable defects, and spots may be visible due to stress of switching elements inside of the display area.

SUMMARY OF THE INVENTION

The present invention provides a display device that tests the operation thereof by ensuring the size of the testing thin film transistor.

Additional features of the invention will be set forth in the description which follows, and in part will be apparent from the description, or may be learned by practice of the invention.

An exemplary embodiment of the present invention discloses a display device including a substrate, a display signal line disposed on the substrate, a contact assistant disposed on a pad region of the substrate as a draw-out terminal of the display signal line, a driver IC chip disposed on the substrate and connected to the display signal line through the contact assistant, and a testing thin film transistor disposed between the substrate and the driver IC chip. The testing thin film transistor and the display signal line are connected to each other in the pad region.

The display signal line may be a gate line or a data line.

When the display signal line is a gate line, the display device may further comprise a gate insulating layer formed on the gate line, wherein the testing thin film transistor may comprise a gate electrode on the same layer as the gate line, a semiconductor disposed on the gate insulating layer and overlapping the gate electrode, and a source electrode and a drain electrode disposed on the semiconductor.

The display device may further include at least one test signal line connected to the source electrode, the test signal line to transmit a test signal to the source electrode.

The gate insulating layer have a first contact hole to expose the display signal line, the first contact hole being disposed in the pad region, and the drain electrode may contact the display signal line through the first contact hole.

The display device may further include a passivation layer disposed on the source electrode, the drain electrode, and the gate insulating layer, the passivation layer has a second contact hole to expose the drain electrode in the pad region, and the contact assistant contacts the drain electrode through the second contact hole.

The driver IC chip may include an output terminal, and the output terminal is connected to the contact assistant.

The passivation layer and the gate insulating layer may have a third contact hole disposed in the pad region and exposing the display signal line, and the contact assistant contacts the display signal line through the third contact hole.

An exemplary embodiment of the present invention also discloses a display device including a substrate, a display signal line disposed on the substrate, a testing thin film transistor having a drain electrode directly connected to the display signal line, a contact assistant connected to the drain electrode, and a driver IC chip disposed on the contact assistant.

An exemplary embodiment of the present invention also discloses a display device including a substrate, a display signal line disposed on the substrate, a testing thin film transistor disposed on the substrate, a contact assistant simultaneously connected to the testing thin film transistor and the display signal line, and a driver IC chip disposed on the contact assistant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
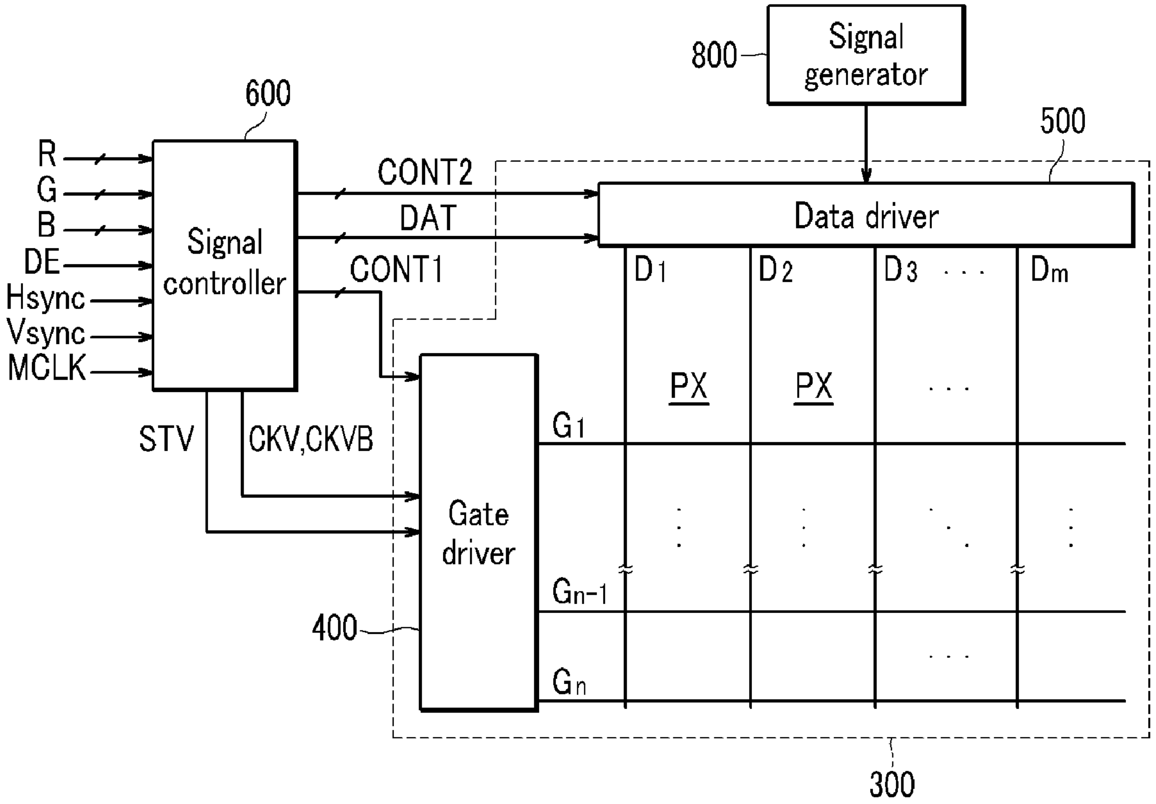
FIG. 1 is a block diagram of a display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Now, a display device according to an exemplary embodiment of the present invention will be described with reference to FIG. 1 and FIG. 2.

Figure 2:
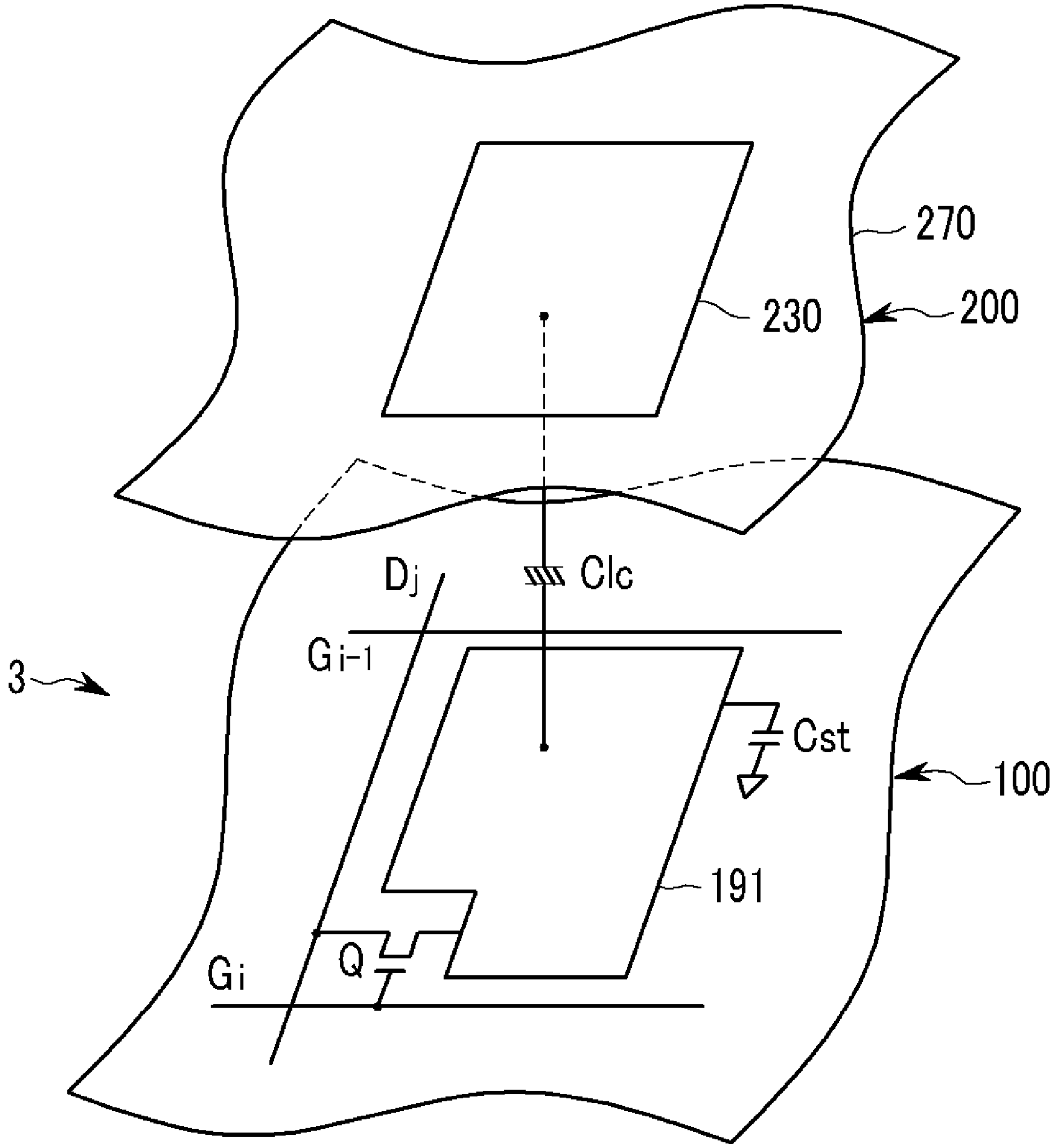
FIG. 2 is an equivalent circuit diagram of one pixel of a display device according to an exemplary embodiment of the present invention.

FIG. 1 is a block diagram of a display device according to an exemplary embodiment of the present invention, and FIG. 2 is an equivalent circuit diagram of one pixel of a display device according to an exemplary embodiment of the present invention.

A display device according to an exemplary embodiment of the present invention includes a display panel assembly 300, a gate driver 400 and a data driver 500 connected thereto, a signal generator 800 connected to the data driver 500, and a signal controller 600 connected to the gate driver 400 and the data driver 500 to control them.

The display panel assembly 300 includes a plurality of display signal lines $G_1$-$G_n$ and $D_1$-$D_m$ and a plurality of pixels PX arranged in a matrix arrangement.

The display signal lines $G_1$-$G_n$ and $D_1$-$D_m$ include a plurality of gate lines $G_1$-$G_n$ to transmit gate signals (referred to as "scanning signals") and a plurality of data lines $D_1$-$D_m$ to transmit data signals. The gate lines $G_1$-$G_n$ extend parallel to each other in a row direction, and the data lines $D_1$-$D_m$ extend parallel to each other in a column direction.

Each pixel PX, e.g., a pixel PX connected to an $i^{th}$ (i=1, 2, . . . n) gate line $G_i$ and a $j^{th}$(j=1, 2, . . . m) data line $D_j$, includes a switching element Q connected to the gate line $G_i$ and the data line $D_j$, and a pixel circuit connected thereto.

The switching element Q is a three terminal element such as a thin film transistor and may provided on the lower panel 100. A control terminal of the switching element Q is connected to the gate line $G_i$, an input terminal thereof is connected to the data line $D_j$, and an output terminal thereof is connected to the liquid crystal capacitor Clc and the storage capacitor Cst.

When the flat panel display is a liquid crystal display, as shown in FIG. 2, the display panel assembly 300 includes a lower panel 100 and an upper panel 200 with a liquid crystal layer 3 disposed therebetween, and the display signal lines $G_1$-$G_n$ and $D_1$-$D_m$ and the switching element Q are provided on the lower panel 100. The pixel circuit of the liquid crystal display includes the liquid crystal capacitor Clc and the storage capacitor Cst, which are connected to the switching element Q. The storage capacitor Cst may be omitted if necessary.

The terminals of the liquid crystal capacitor Clc include a pixel electrode 191 of the lower panel 100 and a common electrode 270 of the upper panel 200. The liquid crystal layer 3 between the two electrodes 191 and 270 serves as a dielectric material. Unlike in FIG. 2, the common electrode 270 may be provided in the lower panel 100, and in this case, at least one of the two electrodes 191 and 270 may be formed to have a line shape or a bar shape.

The storage capacitor Cst includes a separate signal line (not shown) that overlaps the pixel electrode 191, the pixel electrode 191, and an insulator disposed therebetween. A voltage such as the common voltage Vcom is applied to the separate signal line.

For color display, as shown in FIG. 2, each pixel PX includes a color filter 230, which represents one of the primary colors and is disposed in a region of the upper display panel 200 corresponding to a pixel electrode 191. Alternatively, the color filter 230 may be disposed above or below the pixel electrode 191 of the lower display panel 100.

Again referring to FIG. 1, the signal controller 600 processes input image signals, such as red (R), green (G), and blue (B) image signals R, G, B, according to an operating condition of the liquid crystal panel assembly 300 based on the input image signals R, G, B and the input control signals, such as a data enable signal DE, horizontal and vertical synchronization signals Hsync and Vsync, a master clock MCLK, to generate a gate control signal CONT1, a data control signal CONT2, and a processed image signal DAT, and thereafter sends the generated gate control signal CONT1 to the gate driver 400 and the generated data control signal CONT2 and the processed image signal DAT to the data driver 500. The signal controller 600 sends a scanning start signal STV and clock signals CKV and CKVB to the gate driver 400.

The data driver 500 selects gray voltages corresponding to each image data DAT among the gray voltages from the signal generator 800 to convert the image data DAT into the corresponding data voltages and applies them to the data lines $D_1$ to $D_m$ as data signals. The data driver 500 is formed by the same process as the switching element Q, and is integrated on the display panel assembly 300. However, the data driver 500 does not have to be integrated on the display panel assembly 300.

The gate driver 400 is connected to the gate lines $G_1$-$G_n$ of the display panel assembly 300 and transmits gate signals to the gate lines $G_1$-$G_n$. The gate driver 400 is formed by the same process as that of the switching element Q, and is integrated on the display panel assembly 300. However, the gate driver 400 does not have to be integrated on the display panel assembly 300. Also, the gate driver 400 is disposed on one end of the display panel assembly 300. However, a gate driver 400 may be disposed on each end of the display panel assembly 300.

The gate driver 400 applies gate signals having two values of the gate-on voltage Von and the gate-off voltage Voff according to the scanning start signal STV and a pair of clock signals CKV and CKVB from the signal controller 600 to the gate lines $G_1$-$G_n$, such that the switching elements Q connected to the gate lines $G_1$-$G_n$ are turned on or turned off. Here, the scanning start signal STV and the pair of clock signals CKV and CKVB are transmitted from the signal controller 600 to the gate driver 400 through the signal lines formed on the lower panel 100 directly or via the data driver 500.

Next, the structure of the display device according to an exemplary embodiment of the present invention will be described with reference to FIG. 3, FIG. 4, and FIG. 5, as well as FIG. 1 and FIG. 2.

Figure 3:
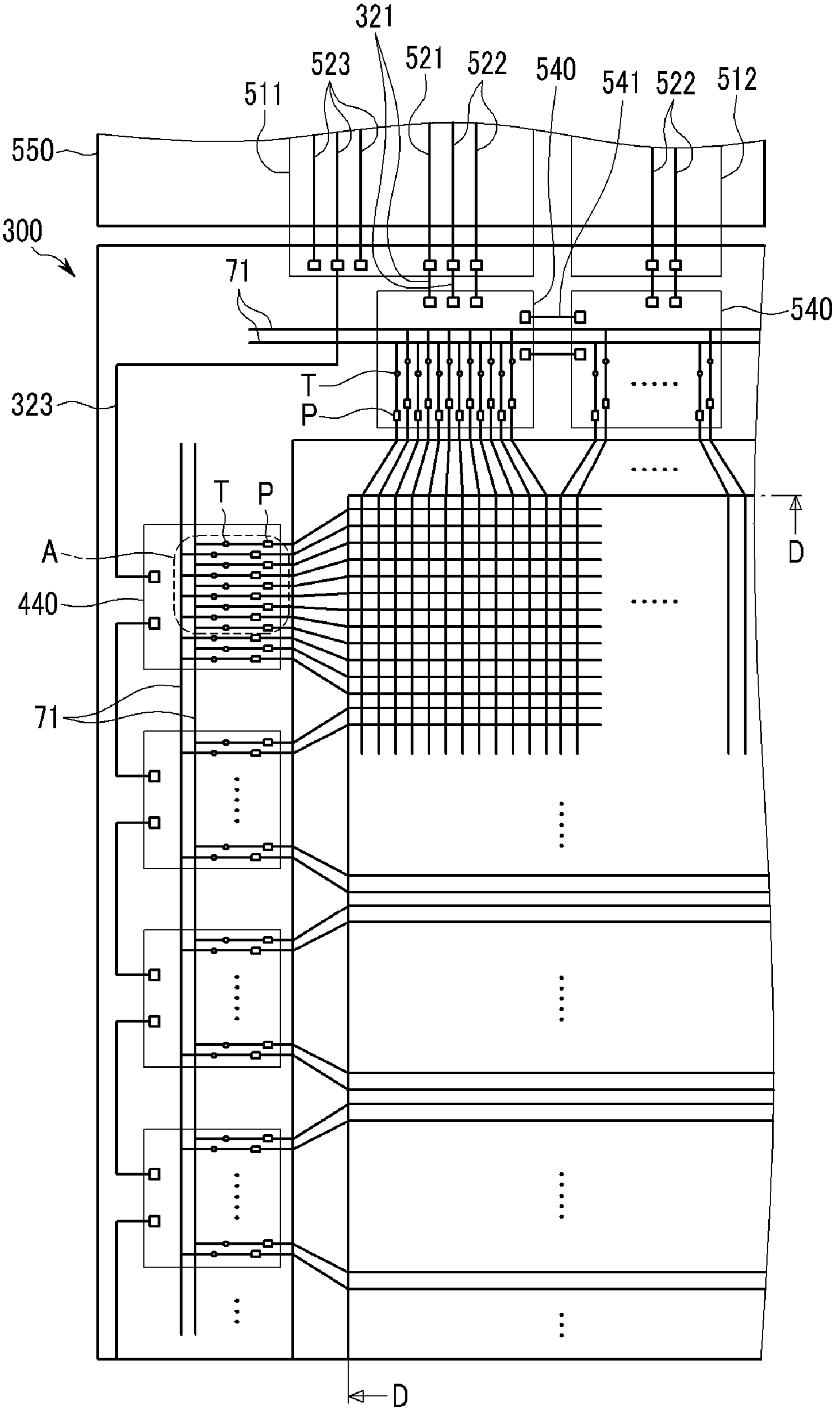
FIG. 3 is a layout view of the display panel including the gate driver and the data driver shown in FIG. 1.
Figure 4:
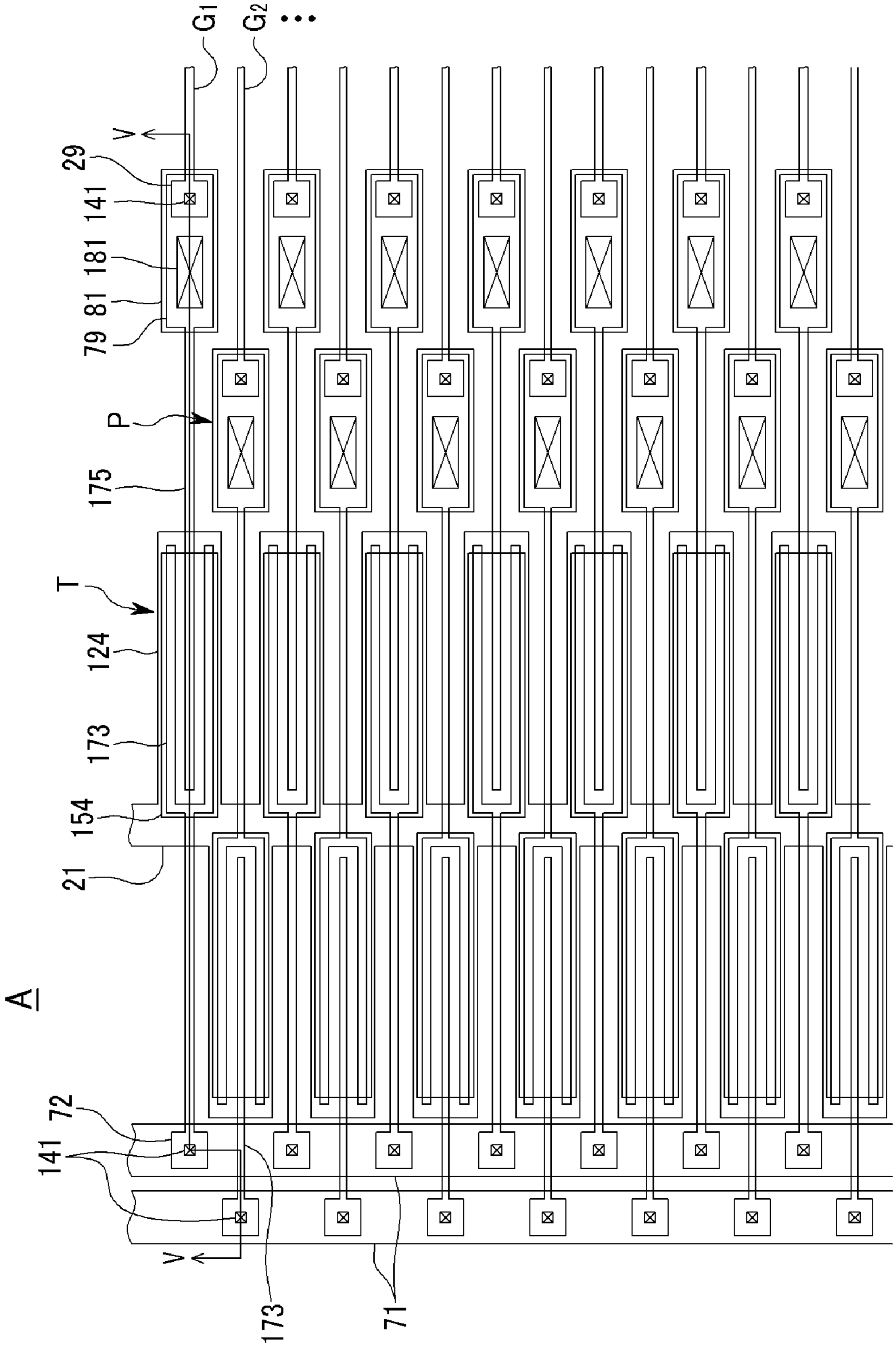
FIG. 4 is an enlarged view of portion A shown in FIG. 3.
Figure 5:
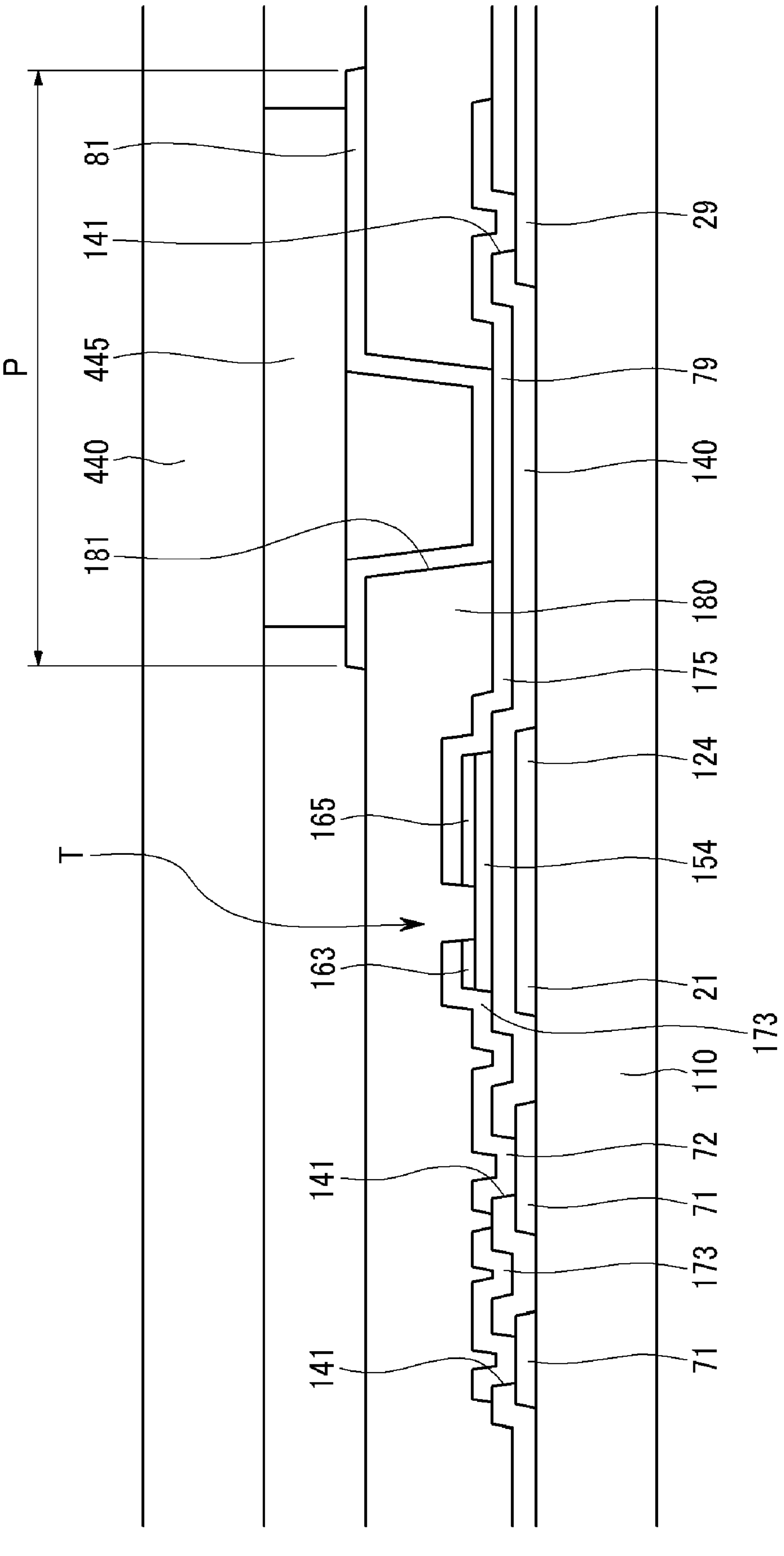
FIG. 5 is a cross-sectional view of the display device shown in FIG. 4 taken along line V-V.

FIG. 3 is a layout view of the display panel including the gate driver and the data driver shown in FIG. 1, FIG. 4 is an enlarged view of an A portion shown in FIG. 3, and FIG. 5 is a cross-sectional view of the display device shown in FIG. 4 taken along line V-V.

Referring to FIG. 3, a printed circuit board (PCB) 550 is located on the upper side of the display panel assembly 300 provided with the gate lines $G_1$-$G_n$ and the data lines $D_1$-$D_m$. The PCB 550 includes circuit elements such as the signal controller 600, the driving voltage generator 700, and the signal generator 800. The display panel assembly 300 and the PCB 550 are connected to each other through flexible printed circuit films 511 and 512.

A plurality of data transmitting lines 521 and a plurality of driving signal lines 522 and 523 are formed on the leftmost flexible printed circuit film 511. The data transmitting lines 521 are connected to the input terminals of the data driver IC chip 540 through lead lines 321 formed on the display panel assembly 300 to transmit the gray signals. The driving signal lines 522 and 523 transmit power voltages and control signals for the operation of the gate and data driver IC chips 440 and 540 to the gate and data driver IC chips 440 and 540 through the lead lines 321 and 323 formed on the display panel assembly 300.

A plurality of driving signal lines 522 to transmit the driving and control signals to the data driver IC chip 540 connected thereto are formed in the other flexible printed circuit film 512. The data transmitting lines 521 and the driving signal lines 522 and 523 are connected to the circuit elements of the printed circuit board PCB 550 to receive the signal therefrom. On the other hand, an additional printed circuit board PCB may be provided and the driving signal line 523 may be formed thereon.

A plurality of pixel areas, which are defined where the gate lines $G_1$-$G_n$ extending in a transverse direction cross the data lines $D_1$-$D_m$ extending in a longitudinal direction, form a display area D to display images. The gate lines $G_1$-$G_n$ and the data lines $D_1$-$D_m$ are respectively parallel to each other in the display area D. However, they are collectively positioned on one portion and grouped into fan-like shapes in a "fan-out" area as they leave the display area D. The lines are then again parallel to each other.

The data driving IC chips 540 are disposed on the upper side outside of the display area D of the display panel assembly 300 and are sequentially arranged in the transverse direction. Adjacent data driving IC chips 540 are connected by a plurality of interconnection lines 541. The gray signals transmitted from the flexible printed circuit film 511 to the leftmost data driving IC chip 540 is transmitted to the next data driving IC chip 540 via the interconnection lines 541, and so on.

At least one VI signal line 71 is formed under the data driver IC chips 540 in the transverse direction, and end portions thereof are connected to test pads (not shown). A plurality of testing thin film transistors T are formed under each data driver IC chip 540. One end of each testing thin film transistor T is connected to a VI signal line 71 and the other end thereof is connected to an end portion of one of the data lines $D_1$-$D_m$ in the pad region P. When the number of VI signal lines 71 is more than two, the testing thin film transistors T may be alternately connected to the VI signal lines 71.

The gate driving IC chips 440 are mounted near the left edge of the panel assembly 300 external to the display area D, and are arranged in the longitudinal direction. The driving signal lines 523 of the flexible printed circuit film 511, the gate driving IC chips 440, and the neighboring gate driver IC chips 440 are connected to each other.

At least one VI signal line 71 is formed under the gate driver IC chip 440 in the longitudinal direction, and the end portion thereof is connected to the test pad (not shown). A testing thin film transistor T is formed under the gate driver IC chip 440. One end of the testing thin film transistor T is connected to the VI signal line 71, and the other end thereof is connected to the end portion of one of the gate lines $G_1$-$G_n$ in the pad region P.

The testing thin film transistor T and the VI signal line 71 disposed under the gate and data driver IC chips 440 and 540 will be described with reference to FIG. 4 and FIG. 5.

Referring to FIG. 4 and FIG. 5, a plurality of gate conductors including a VI signal line 71, a gate signal transmitting line 21 including a plurality of gate electrodes 124, and the gate lines $G_1$-$G_n$ are formed on a substrate 110.

The VI signal lines 71 include two lines extending in the longitudinal direction and parallel to each other. The test pad (not shown) is connected to one end of the VI signal lines 71 and receives test signals from the test pad.

The gate signal transmitting line 21 transmits gate signals for VI and extends in the longitudinal direction. The gate electrodes 124 extend at both sides with respect to the gate signal transmitting line 21, and the gate electrodes 124 disposed on both sides are alternately arranged according to the signal transmitting line 21.

The gate lines $G_1$-$G_n$ transmit gate signals and extend in the transverse direction. Each gate line $G_1$-$G_n$ includes an end portion 29 having a wide area for connection with another layer or an external driving circuit.

The gate conductors 21, 71, 124, and $G_1$-$G_n$ may be made of aluminum-based metals such as aluminum (Al) and aluminum alloys, silver-based metals such as silver (Ag) and silver alloys, copper-based metals such as copper (Cu) and copper alloys, molybdenum-based metals such as molybdenum (Mo) and molybdenum alloys, chromium (Cr), titanium (Ti), or tantalum (Ta).

A gate insulating layer 140, which may be made of silicon nitride ($SiN_x$) or silicon oxide ($SiO_x$), is formed on the gate conductors 21, 71, 124, and $G_1$-$G_n$. The gate insulating layer 140 has a plurality of contact holes 141 respectively connecting the VI signal lines 71 and the end portions 29 of the gate lines $G_1$-$G_n$.

A plurality of semiconductors 154, a plurality of ohmic contacts 163 and 165, and a plurality of source electrodes 173 and a plurality of drain electrodes 175 are formed on the gate insulating layer 140.

The semiconductors 154, which may be made of hydrogenated amorphous silicon or polysilicon, overlap the gate electrodes 124. The ohmic contacts 163 and 165 may be made of a material such as n+ hydrogenated amorphous silicon in which an n-type impurity is doped with a high concentration, polysilicon, or silicide, and are disposed on the semiconductors 154 to overlap the gate electrodes 124.

Some of the source electrodes 173 include a bar shaped portion and a "U" shaped portion and the rest include only a bar shaped portion without a "U" shaped portion. The source electrodes 173 are alternately disposed according to the longitudinal direction. The curved portion of the "U" shape of the source electrodes 173 overlaps the gate electrodes 124 disposed on the right side of the gate signal transmitting line 21.

The source electrodes 173 include end portions 72 having a wide area, and the wide end portions 72 are connected to the VI signal lines 71 through the contact holes 141 of the gate insulating layer 140. The source electrodes 173 are alternately connected to two VI signal lines 71 according to the vertical direction. For example, the left VI signal line 71 is connected to odd-numbered source electrodes 173 that are disposed in the vertical direction, and the right VI signal line 71 is connected to even-numbered source electrodes 173.

The drain electrodes 175 are spaced apart from the source electrodes 173. Some of the drain electrodes 175 include a bar shaped portion and a "U" shaped portion and the rest include only a bar shaped portion without a "U" shaped portion. The drain electrodes 175 that include only a bar shaped portion are paired with the source electrodes 173 that include both a bar shaped portion and a "U" shaped portion, and the drain electrodes 175 including both a bar shaped portion and a "U" shaped form a pair with the source electrodes 173 including only a bar shaped portion.

The drain electrodes 175 have end portions 79 having a wide area, and the wide end portions 79 are connected to the end portions 29 of the gate lines $G_1$-$G_n$ through the contact holes 141 of the gate insulating layer 140.

The source electrodes 173 and the drain electrodes 175 may be made of a refractory metal such as molybdenum, chromium, tantalum, and titanium or alloys thereof, or may have a multilayered structure including a refractory metal layer (not shown) and a conductive layer (not shown) with low resistivity.

Exposed portions of the semiconductors 154 are disposed between the source electrodes 173 and the drain electrodes 175. A gate electrode 124, a source electrode 173, and a drain electrode 175 form the testing thin film transistor T along with the semiconductor 154, and the channel of the testing thin film transistor T is formed on the semiconductor 154 between the source electrode 173 and the drain electrode 175.

A passivation layer 180 is formed on the exposed portions of the semiconductors 154, the source electrodes 173, the drain electrodes 175, and the gate insulating layer 140. The passivation layer 180 may be made of an inorganic insulator such as silicon nitride or silicon oxide. However, the passivation layer 180 may be made of an organic insulator having photosensitivity. Further, the passivation layer 180 may have a dual film structure including a lower inorganic film and an upper organic film so that it protects the exposed semiconductors 154 while maintaining the superior insulating characteristic of the organic film. The passivation layer 180 has a plurality of contact holes 181 exposing the end portions 79 of the drain electrodes 175.

A plurality of pixel electrodes (not shown) and a plurality of contact assistants 81, which may be made of a conductor such as ITO and IZO, are formed on the passivation layer 180. The pixel electrodes are disposed in the display area, and the contact assistants 81 are connected to the end portions 79 of the drain electrodes 175 through the contact holes 181. The portion where the contact assistants 81 are disposed is referred to as a pad region P.

Output terminals 445 of the gate driver IC chips 440 are connected on the contact assistants 81. The connection between the contact assistants 81 and the output terminals 445 may be made through an isotropic conductive film.

According to the present exemplary embodiment, the drain electrodes 175 of the testing thin film transistors T are directly connected to the end portions 29 of the gate lines $G_1$-$G_n$ in the pad region P. Accordingly, space in addition to the pad region P and an additional connecting member to connect thereto may not be needed to connect the drain electrodes 175 of the testing thin film transistors T and the ends 29 of the gate lines $G_1$-$G_n$. Beneficially, the size of the thin film transistor T, particularly the width of the film transistor T, may be maximized in the limited space under the gate driver IC chips 440. Furthermore, the gate lines $G_1$-$G_n$, which may be made of aluminum or the like, directly connect to the drain electrodes 175, and depart from the contact assistants 81, which may include a transparent conductor such as ITO or IZO. Accordingly, corrosion of the aluminum or the like that may be generated due to contact with ITO or IZO may be prevented, and corrosion of the gate line $G_1$-$G_n$ by the etchant used to form the contact assistants 81 may be prevented.

The structure of the data driver IC chips 540, and the testing thin film transistors T and the VI signal lines 71 disposed thereunder, may be almost the same as the structure of the gate driver IC chips 440, and the testing thin film transistors T and the VI signal lines 71 disposed thereunder, which were described above. However, there is a difference in that the drain electrodes 175 of the thin film transistors T are connected to the end portions of the data lines $D_1$-$D_m$.

Next, a display device according to another exemplary embodiment of the present invention will be described with reference to FIG. 6 and FIG. 7.

Figure 6:
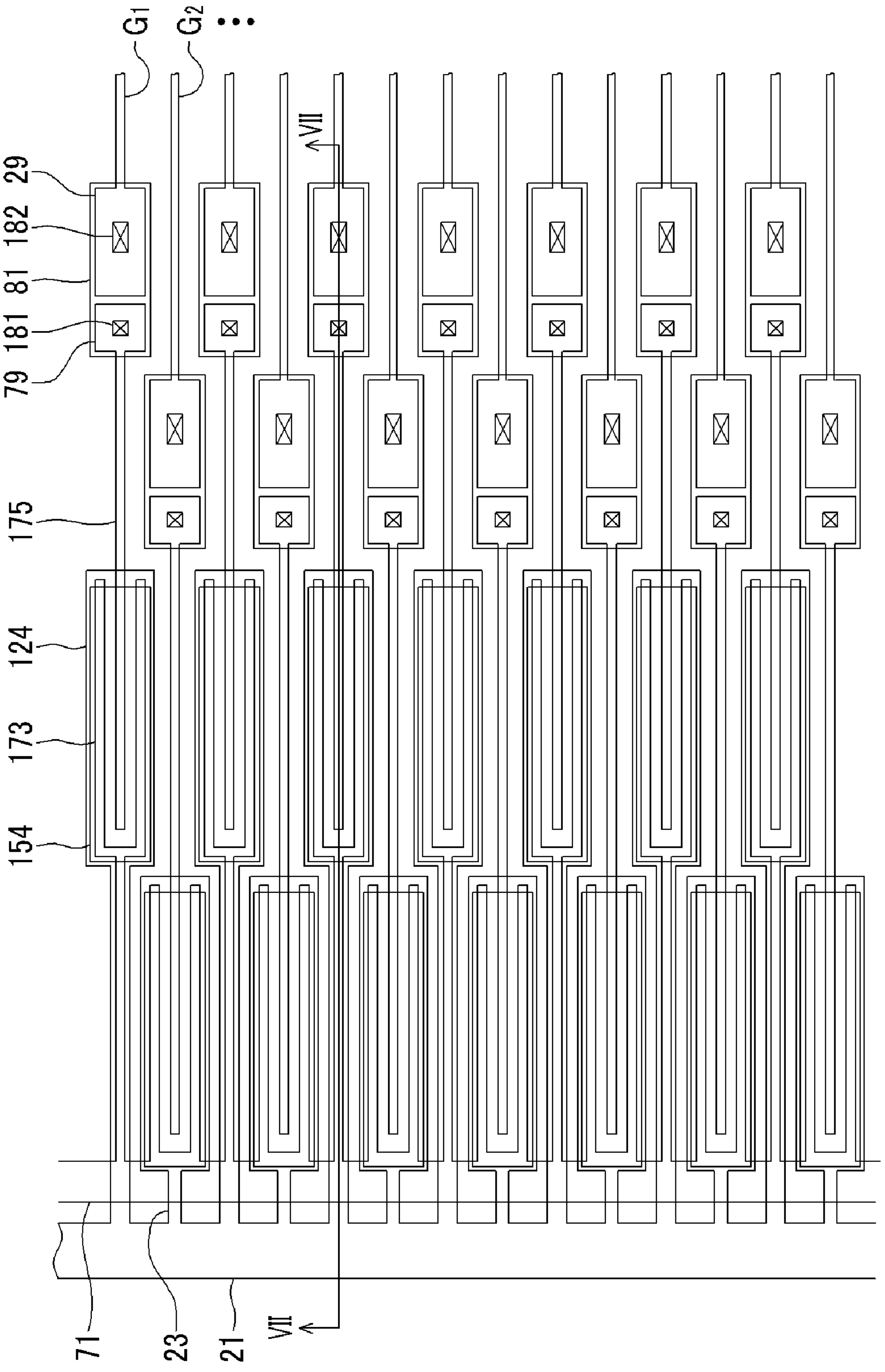
FIG. 6 is an enlarged view of a portion of a display device according to another exemplary embodiment of the present invention.
Figure 7:
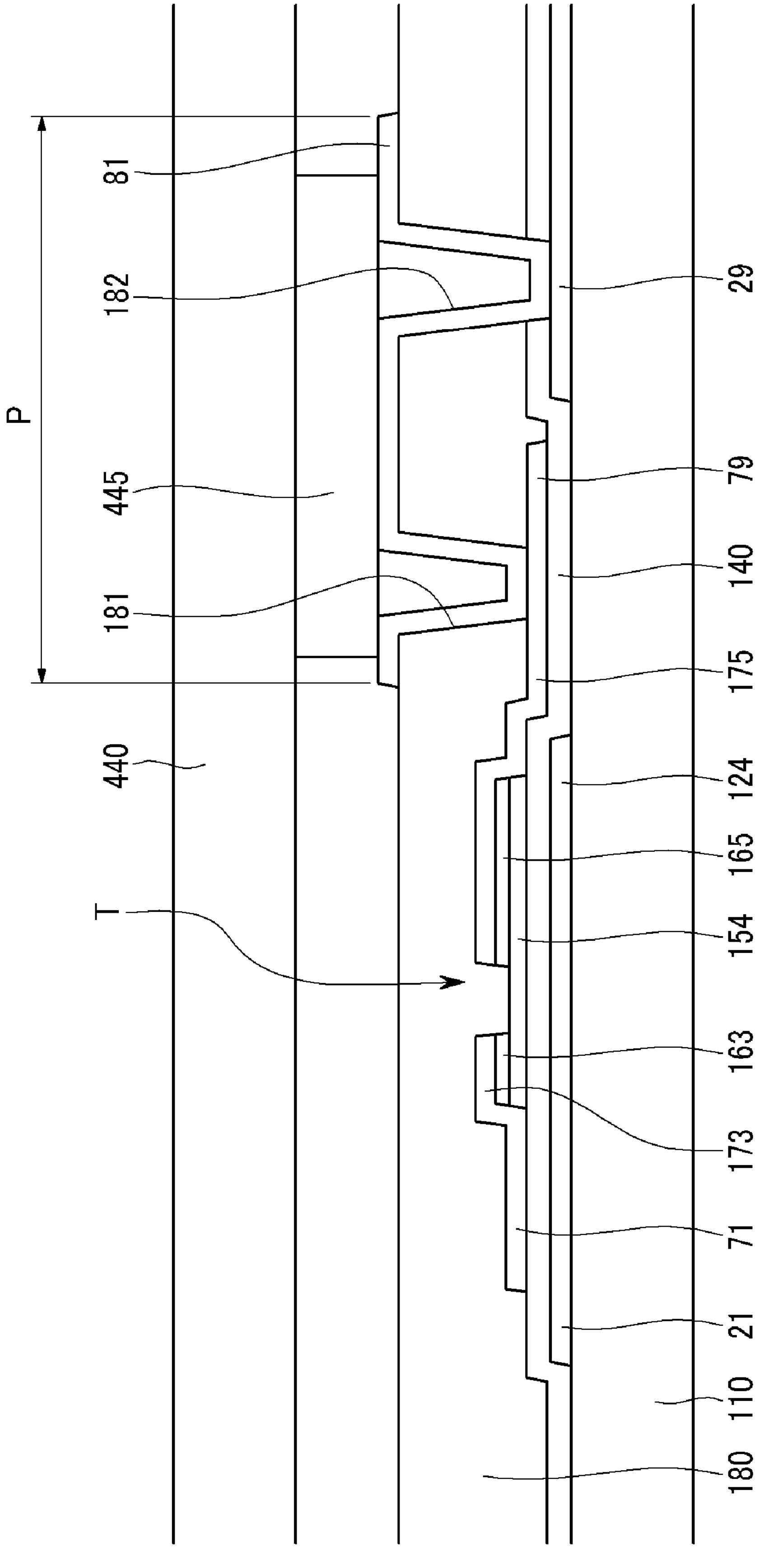
FIG. 7 is a cross-sectional view of the display device shown in FIG. 6 taken along line VII-VII.

FIG. 6 is an enlarged view of a portion of a display device according to another exemplary embodiment of the present invention, and FIG. 7 is a cross-sectional view of the display device shown in FIG. 6 taken along line VII-VII.

Referring to FIG. 6 and FIG. 7, a gate conductor including a gate signal transmitting line 21 having a plurality of gate electrodes 124 and a plurality of gate lines $G_1$-$G_n$ is formed on a substrate 110.

The gate signal transmitting line 21 transmits a gate signal for a VI and extends a vertical direction. The gate signal transmitting line 21 includes a plurality of branch lines 23 extending to the right and a plurality of gate electrodes 124 respectively connected to the branch lines 23. Long branch lines 23 and short branch lines 23 are alternately disposed.

The gate lines $G_1$-$G_n$ transmit gate signals and extend in the horizontal direction. Each gate line $G_1$-$G_n$ includes an end portion 29 having a wide area for connection with another layer or an external driving circuit.

A gate insulating layer 140 is formed on the gate conductors 21, 124, and $G_1$-$G_n$.

A plurality of semiconductors 154, which may be made of hydrogenated amorphous silicon or polysilicon, are formed on the gate insulating layer 140, and a plurality of ohmic contacts 163 and 165 are formed on the semiconductors 154. The semiconductors 154 and the ohmic contacts 163 and 165 overlap the gate electrodes 124.

A VI signal line 71, a plurality of source electrodes 173, and a plurality of drain electrodes 175 are formed on the ohmic contacts 163 and 165 and the gate insulating layer 140.

There is one VI signal line 71, and it extends in the longitudinal direction. The VI signal line 71 is connected to a test pad (not shown) and receives a test signal therefrom.

Some of the source electrodes 173 include a bar shaped portion and a "U" shaped portion and the rest only include a "U" shaped portion without a bar shaped portion, and they are alternately disposed according to the longitudinal direction. The source electrodes 173 including a bar shaped portion and a "U" shaped portion overlap the gate electrodes 124 connected to the long branch lines 23, and the source electrodes 173 having only a "U" shaped portion overlap the gate electrodes 124 connected to the short branch lines 23. The source electrodes 173 are connected to the VI signal line 71 and receive signals to test the operation state of the display device.

The drain electrodes 175 include a bar shaped portion and a wide end portion 79. The drain electrodes 175 are spaced apart from the source electrodes 173, and the bar shaped portions of the drain electrodes 175 are respectively disposed inside the "U" shaped portions of the source electrodes 173.

The exposed portions of the semiconductors 154 are disposed between the source electrodes 173 and the drain electrodes 175. A gate electrode 124, a source electrode 173, and a drain electrode 175 form the testing thin film transistor T along with the semiconductor 154, and the channel of the testing thin film transistor T is formed in the semiconductor 154 between the source electrode 173 and the drain electrode 175.

A passivation layer 180 is formed on the exposed portions of the semiconductors 154, the source electrodes 173, the drain electrodes 175, and the gate insulating layer 140. The passivation layer 180 has a plurality of contact holes 181 exposing the end portions 179 of the drain electrodes 175, and the passivation layer 180 and the gate insulating layer 140 have a plurality of contact holes 182 exposing the end portions 29 of the gate lines $G_1$-$G_n$.

A plurality of contact assistants 81, which may be made of a conductor such as ITO and IZO, are formed on the passivation layer 180. The contact assistants 81 are connected to the end portions 79 and 29 of the drain electrodes 175 and the gate lines $G_1$-$G_n$ through the contact holes 181 and 182. The portion where the contact assistants 81 are disposed is referred to as a pad region P.

Output terminals 445 of the gate driver IC chips 440 are connected to the contact assistants 81.

According to the present exemplary embodiment, the contact assistants 81 connect the drain electrodes 175 of the testing thin film transistors T and the end portions 29 of the gate lines $G_1$-$G_n$, and simultaneously connect the output terminals 445 of the gate driver IC chips 440 and the gate lines $G_1$-$G_n$ as a draw-out terminal of the gate lines $G_1$-$G_n$. Accordingly, additional space to connect the drain electrodes 175 of the testing thin film transistors T and the ends 29 of the gate lines $G_1$-$G_n$ is not necessary beside the pad region P, and furthermore an additional connecting member to connect thereto is not necessary. Beneficially, the size of the thin film transistor T, particularly the width of the film transistor T, may be maximally obtained in the limited space under the gate driver IC chips 440.

The structure of the data driver IC chips 540 and the testing thin film transistors T disposed thereunder may be almost the same as the structure of the gate driver IC chips 440, and the testing thin film transistors T disposed thereunder, which were described above. However, there is a difference in that the drain electrodes of the thin film transistors are connected to the end portions of the data lines.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a substrate;
a display signal line disposed on the substrate;
a contact assistant disposed on a pad region of the substrate;
a driver integrated circuit (IC) chip disposed on the substrate; and
a testing thin film transistor disposed between the substrate and the driver IC chip, the driver IC chip being connected to the testing thin film transistor through the contact assistant in the pad region,
wherein the testing thin film transistor and the display signal line are connected to each other in the pad region without going through the contact assistant.

2. The display device of claim 1, wherein
the display signal line is a gate line or a data line.

3. The display device of claim 2, further comprising:
a gate insulating layer formed on the display signal line, the display signal line being a gate line,
wherein the testing thin film transistor comprises:
a gate electrode on the same layer as the gate line;
a semiconductor disposed on the gate insulating layer and overlapping the gate electrode; and
a source electrode and a drain electrode disposed on the semiconductor.

4. The display device of claim 3, further comprising:
at least one test signal line connected to the source electrode, the test signal line to transmit a test signal to the source electrode.

5. The display device of claim 3, wherein:
the gate insulating layer has a first contact hole to expose the display signal line, the first contact hole being disposed in the pad region; and
the drain electrode contacts the display signal line through the first contact hole.

6. The display device of claim 5, further comprising:
a passivation layer disposed on the source electrode, the drain electrode, and the gate insulating layer,
wherein the passivation layer has a second contact hole to expose the drain electrode in the pad region, and the contact assistant contacts the drain electrode through the second contact hole.

7. The display device of claim 6, wherein:
the driver IC chip includes an output terminal, and the output terminal is connected to the contact assistant.

8. The display device of claim 3, further comprising:
a passivation layer disposed on the source electrode, the drain electrode, and the gate insulating layer,
wherein the passivation layer has a second contact hole to expose the drain electrode, the second contact hole being disposed in the pad region, and the contact assistant contacts the drain electrode through the second contact hole.

9. The display device of claim 1, wherein the contact assistant is spaced apart from the display signal line.

10. The display device of claim 1, wherein the contact assistant is connected to the display signal line via the drain electrode.

11. A display device, comprising:
a substrate;
a display signal line disposed on the substrate;
a testing thin film transistor having a drain electrode directly connected to the display signal line;
a contact assistant connected to the drain electrode; and
a driver integrated circuit (IC) chip disposed on the contact assistant,
wherein the testing thin film transistor and the display signal line are connected to each other without going through the contact assistant.

12. The display device of claim 11, further comprising:
a gate insulating layer disposed between the display signal line and the drain electrode, wherein the drain electrode is connected to the display signal line through a first contact hole formed in the gate insulating layer.

13. The display device of claim 12, wherein:

the first contact hole of the gate insulating layer is disposed under the contact assistant.

14. The display device of claim 13, further comprising:

a passivation layer disposed between the drain electrode and the contact assistant, wherein the contact assistant is connected to the drain electrode through a second contact hole formed in the passivation layer.

15. The display device of claim 10, wherein the contact assistant is spaced apart from the display signal line.

16. The display device of claim 10, wherein the contact assistant is connected to the display signal line via the drain electrode.

* * * * *

UNITED STATES PATENT AND TRADEMARK OFFICE

CERTIFICATE OF CORRECTION

PATENT NO. : 8,330,927 B2
APPLICATION NO. : 12/194810
DATED : December 11, 2012
INVENTOR(S) : Yong-Koo Her and Yong-Han Park It is certified that error appears in the above-identified patent and that said Letters Patent is hereby corrected as shown below:

On the Title Page

Item (30) Foreign Application Priority Data

"Mar. 28, 2008 (KR)........................10-2008-0029029", should read
-- Mar. 28, 2008 (KR)........................10-2008-0029092 --

Signed and Sealed this
Fifth Day of February, 2013

Teresa Stanek Rea
*Acting Director of the United States Patent and Trademark Office*